Figures 5, 6:
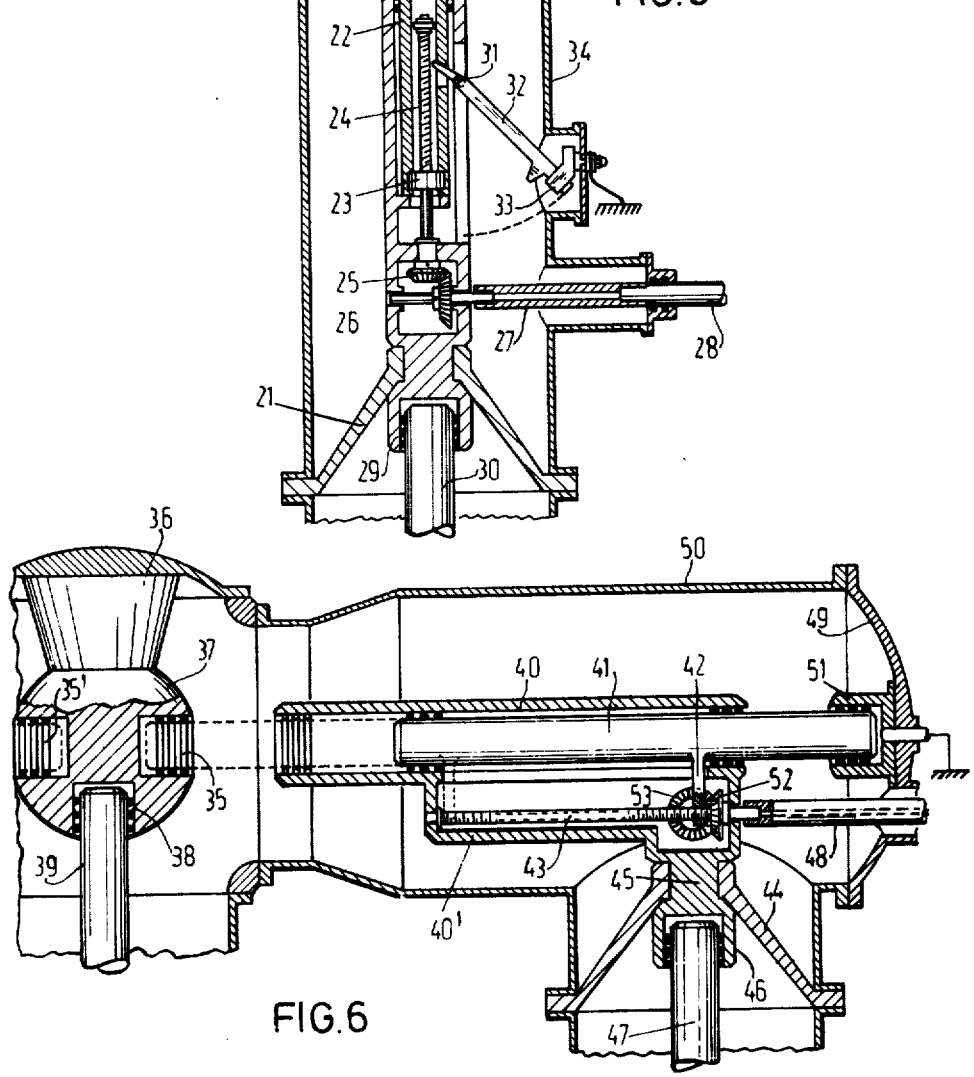

United States Patent [19]

Boersma et al.

[11] 3,886,336
[45] May 27, 1975

[54] METAL CLAD SWITCH GEAR FOR HIGH VOLTAGES

[75] Inventors: Rintje Boersma, Harmelen; Gijsbert Waldemar Irik, Bilthoven, both of Netherlands

[73] Assignee: COQ B.V., Utrecht, Netherlands

[22] Filed: Apr. 11, 1974

[21] Appl. No.: 459,939

[52] U.S. Cl. ............................ 200/48 R; 200/148 R
[51] Int. Cl. ............................................. H01h 31/00
[58] Field of Search .......... 200/48 R, 148 R, 148 B, 200/148 D, 48 SB, 48 CB; 317/59

[56] References Cited
UNITED STATES PATENTS 3,665,135  5/1972  Boersma et al. ............... 200/48 R X
3,777,083  12/1973  Olson et al. ...................... 200/48 R

*Primary Examiner*—Robert K. Schaefer
*Assistant Examiner*—William J. Smith
*Attorney, Agent, or Firm*—Synder, Brown and Ramik

[57] ABSTRACT

Metal clad switch gear for high voltage consisting of switching sections which are connected in series in a closed ring and extend between junction points for the connection of cables or other network-lines, each switching section comprising the series connection of an isolator switch, a circuitbreaker and an isolator switch, these isolator switches cooperating on their side connected to the circuit-breaker with earthing switches and the isolator switches and the earthing switches of each section being simultaneously operated.

4 Claims, 6 Drawing Figures

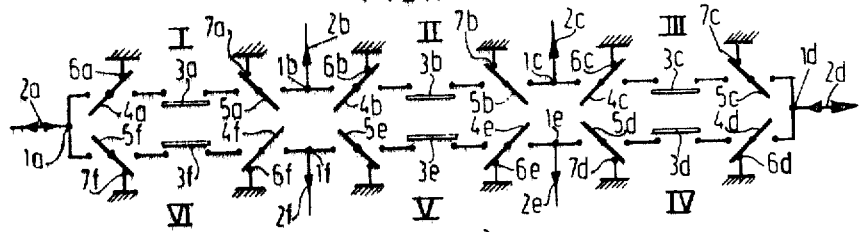

METAL CLAD SWITCH GEAR FOR HIGH VOLTAGES

The invention relates to metal clad switch gear for high voltages provided in each phase with coupled single-pole switching sections which are connected in series in a closed ring and each extend in said ring between two junction points for the connection of cables or network-lines, said switching sections comprising each at least two isolator switches, a circuit-breaker connected therebetween and two earthing switches cooperating each with an isolator switch.

If the switching sections are connected in a ring in the mentioned manner a second busbar system and the isolator switches and coupling sections going therewith can be dispensed with, since in that case every outgoing cable or line can be fed either in one direction or in the other direction or in both directions through the ring.

Switch gear having switching sections connected in a ring, such switch gear being usable without difficulties in many switching stations, has a simpler construction than switch gear provided with a double busbar system for the same number of connections.

In order to be able to set a part of two parts of metal clad switch gear adapted to be interconnected or separated by an isolator switch so free from tension as to be able to open said part without danger and to work safely on it, while the other part remains alive, one has already proposed to construct said isolator switch as a switch with simultaneous double interruption and to provide it with two switching chambers separated from one another by an insulating partition in an air-tight manner and with an earthing switch cooperating with the isolator switch contacts carried by said partition. Isolator switches of this type have a complicated and expensive construction.

The invention has the object to dispense with the need of using such isolator switches with double interruption in switch gear having switching sections connected in a ring and owing thereto to make said switch gear considerably simpler and cheaper. According to the invention this is achieved in that each one of said isolator switches is a switch with single interruption and is provided with a stationary contact and a movable switching contact cooperating therewith and operated by a driving mechanism, one of those two isolator switch contacts being permanently electrically conductively connected with such a junction point and the other one being permanently electrically conductively connected with a connecting conductor of the circuit-breaker and with a contact of such an earthing switch and the driving mechanisms of the two isolator switches and the earthing switches cooperating therewith of each switching section being coupled with one another, the arrangement being such, that during the operations of closing and opening the switching section said isolator switches are simultaneously brought from the open into the closed and from the closed into the open condition, respectively, and the earthing switches are simultaneously brought from the closed into the open and from the open into the closed condition, respectively.

In switch gear provided with switching sections connected in a ring the two simultaneously closing and opening isolator switches which are separated by the circuit-breaker of a switching section and are connected to earth on their sides connected to the circuit-breaker, when they are in their open condition, have the same effect as the mentioned isolator switches with double interruption, since, when the two isolator switches with single interruption of a switching section are in their open condition, the circuit-breaker of said switching section can be opened, inspected and, if necessary, repaired, while all junction points, that means also those adjacent to said switching section, are alive, and, when the two isolator switches of each one of the two switching sections adjoining each other through a junction point are opened and the cable or network-line connected to said junction point is also detached at its end remote from the switch gear from the network, a transformer or other voltage source, said junction point, the two isolator switches directly connected thereto and the circuit-breakers of the two switching sections in question are accessible to inspection, repair and/or replacement, while all other junction points remain in operation. Consequently, all parts of switch gear of the type referred to provided with isolator switches with single interruption can be safely made free from tension and accessible as well as those of such switch gear having isolator switches with double interruption.

The operation of the isolator switches and the earthing switches coupled therewith can be considerably simplified, if the movable switching contact of each isolator switch of a switching section is permanently electrically conductively connected with the circuit-breaker of said section, since in that case the earthing switches can be driven directly by the movable switching contacts of said isolator switches.

The switch gear may be advantageously so constructed, that the movable switching contact of each isolator switch of a switching section is an axially movable switching rod and the earthing switch is provided with at least one switching contact carried by the support of said switching rod and both driven and locked in its end positions by said switching rod, said switching contact of the earthing switch being mounted for swinging about an axis directed at right angles with the longitudinal axis of said switching rod, and with one fixed contact attached to the casing of the isolator switch and meant for connection with earth. If, however, the earthing switches must be capable of conducting great currents, a construction is recommended, in which the axially movable switching rod of each isolator switch engages in its one end position with its one end the fixed contact of the isolator switch and in its other end position with its other end a fixed contact attached to the casing of said isolator switch and meant for connection with earth, so that the movable switching rod of the isolator switch is also the movable switching contact of the earthing switch cooperating therewith.

The invention will be further elucidated with the aid of the drawing. In the drawing show:

FIG. 1 a diagrammatical view of a phase of already used switch gear provided with switching sections connected in a ring, in which each section comprises isolator switches with double interruption, FIG. 2 a diagrammatical view of a phase of switch gear provided with switching sections connected in a ring and carried out in accordance with the invention, FIG. 3 an elevational view of a portion of the switch gear shown in FIG. 2, FIG. 4 an elevational view of a portion of a variant of the switch gear shown in FIG. 2, FIG. 5 on a larger scale an axial sectional view of an isolator switch used in the switch gear shown in FIG. 3 and FIG. 6 on a larger scale an axial sectional view of an isolator switch used in the switch gear shown in FIG. 4.

In FIG. 1 six switching sections I, II, III, IV, V, VI are connected in series in a ring. In the connections between said switching sections there are junction points 1a, 1b, 1c, 1d, 1e, 1f for the connection of cables or overhead network lines 2a, 2b, 2c, 2d, 2e, 2f. Each switching section consists of a circuit-breaker 3a, 3b, 3c, 3d, 3e, 3f, an isolator switch with double interruption 4a, 4b, 4c, 4d, 4e, 4f connected to one end of the circuit-breaker and an isolator switch with double interruption 5a, 5b, 5c, 5d, 5e, 5f connected to the other end thereof. The movable switching contacts of all isolator switches are connected with or engage in the open condition of these switches a grounded contact 6a, 6b, 6c, 6d, 6e, 6f, 7a, 7b, 7c, 7d, 7e, 7f through earthing switches which are not shown in the diagram of connections.

From each feeding junction point each other junction point and the cable or network-line connected thereto can be fed along two ways owing to the ring connection of the switching sections. For instance, the cable or network-line 2c can be fed from the feeding junction point 1a both through the switching sections I and II and through the switching sections VI, V, IV, III.

Each switch can be so isolated from the either parts of the switch gear as to allow safe working thereon. For instance, if the circuit-breaker 3b of the switching section II should be made accessible to inspection and repair, the isolator switches 4b and 5b are opened. In that case only the switching section II is out of operation. If one should have to work on the junction point 1b or the cable or network-line 2b, it is necessary to detach said cable or network-line at the end thereof remote from the switch gear from the network as well as to open the isolator switches 5a and 4b. This case requires that the two switching sections I an II are put out of operation. In order to isolate, for instance, the isolator switch 4b one has to make the junction point 1b and the cable or network-line 2b dead and also to open the isolator switches 5a and 5b. Also then the switching sections I and II are out of operation.

It has appeared that the same possibilities of putting parts of the switch gear out of operation and the same safety for the person, who has to work on such a part, are obtained, if, in accordance with the invention, each switching section is provided with isolator switches with single interruption instead of isolator switches with double interruption. However, in that case the two isolator switches of each switching section must be so coupled with one another that they are simultaneously opened and closed and furthermore it is then necessary that the contact of each isolator switch which is permanently electrically conductively connected with the circuit-breaker cooperates with or forms parts of the earthing switch. Switch gear provided with isolator switches with single interruption complying with these two conditions is diagrammatically shown in FIG. 2.

Also the switch gear shown in FIG. 2 comprises six switching sections I, II, III, IV, V, VI connected in series in a ring and each provided with a circuit-breaker 3a–f. However, the circuit-breakers are each connected between two isolator switches 8a–f, 9a–f with single interruption, of each of which the contact which is permanently connected with the circuit-breaker is connected to earth when the isolator switch is in its open condition. The two isolator switches of each switching section are coupled with one another by means of 10a–f, so that they are simultaneously driven.

If, for instance, in this switch gear the isolator switches 8b and 9b of the switching section II are opened, the circuit-breaker 3b is connected at both ends to earth through the contacts 6b and 7b, so that work can be done on said circuit-breaker without danger. Furthermore the junction point 1b or the adjacent isolator switch 9a or 8b are safely accessible, if the cable or the network-line 2b at its other end has been separated from the network and on one hand the pair of isolator switches 8a, 9a and on the other hand the pair of isolator switches are opened. Then the parts of the switching sections I and II are connected to earth through the contacts 6a and 7b.

FIG. 3 shows an elevational view of the switching sections V and VI of the switch gear illustrated in FIG. 2. Therein the isolator switches are each constructed as a switch provided with an axially movable vertical switching rod. FIG. 4 is an elevational view of the switching sections V and VI of the switch gear shown in FIG. 2, in which each isolator switch is provided with an axially movable horizontal switching rod. The isolator switches 8e, 9e and 8f, 9f are driven through rotatable driving shafts 11e, 12e and 11f, 12f, respectively, by a common driving mechanism 13e, 13f. The isolator switches and the driving mechanism of each switching section are mounted on top of the circuit-breaker of the switching section.

The construction of the isolator switches shown in FIG. 3 appears from FIG. 5. These switches are each provided with a spherical contact holder 14, which is attached through a supporting insulator 15 to a detachable cover 16 forming part of the metal casing of the switch and carries both the fixed contact 17 of the isolator switch and a contact 18 for the connecting conductor 19 leading to a junction point (not shown) for the connection of a cable or network-line. This switch comprises also a second contact holder 20 in the shape of a vertical tube, which is supported by an insulator 21 and contains the vertically movable switching rod 22 formed also as a tube and cooperating with the fixed contact 17. Fixed in the switching rod 22 is a nut 23 which is screwed on a screwed spindle 24 extending along the axis of the switching rod. This screwed spindle is rotatably supported in the contact holder 20 and is driven through bevel gear wheels 25, 26, an insulator 27 and a driving shaft 28 by a driving mechanism (not shown). If the isolator swwitch shown in FIG. 5 corresponds to the isolator switch illustrated in FIG. 3 the driving shaft 28 corresponds with the driving shaft 12e shown in FIG. 3.

At its lower end the contact holder 20 is provided with a contact 29 for the connecting conductor 30 leading to the circuit-breaker (not shown). It also carries the earthing switch switching contact 32 mounted for swinging about the axis 31 and driven by the switching rod 22. The fixed contact 33 of the earthing switch is attached to the part 34 of the casing of the switch and connected to earth. The earthing switch 32, 33 is so driven by the switching rod 22 of the isolator switch, that in the closed condition of the isolator switch the earthing switch is opened and in the open condition of the isolator switch the earthing switch is closed. Due to this construction of the isolator switch the condition that the isolator switch contact which is permanently electrically conductively connected with the circuit-breaker is connected to earth in the open condition of the isolator switch is complied with.

FIG. 6 shows a construction of each isolator switch of the switch gear illustrated in FIG. 4. Therein the fixed contact of the isolator switch is provided in the spherical contact holder 37 supported by the insulator 36. This contact holder also carries the fixed contact 35 of a corresponding isolator switch of an adjacent switching section and a contact 38 for a connecting conductor 39 leading to the connecting means (not shown) for a cable or a network-line. The spherical contact holder thus forms at the same time the junction point meant for the connection of a cable or network-line and provided between two switching sections.

The second contact holder of this isolator switch has the shape of a horizontal tube 40, in which an axially movable horizontal switching rod 41 can be moved to and fro. For its movement the switching rod 41 is provided with an arm 42 which has an internally threaded boring, through which a horizontal screwed spindle 43 extends. This spindle is rotatably supported in a part 40' formed on the holding tube 40. Said part 40' is provided with a rod 45 extending through an insulator 44 meant for carrying the contact holder. The lower end of said rod 45 carries a contact 46 for a connecting conductor 47 leading to the circuit-breaker (not illustrated). The screwed spindle 43 is driven through an insulator 48 by a driving shaft (not shown) corresponding to the driving shafts 12e and 12f shown in FIG. 4.

The left hand end portion of the switching rod 41 co-operates with the fixed contact 35 and constitutes together therewith the isolator switch, whereas the right hand end portion of said switching rod cooperates with a fixed contact 51 which is supported by an end cover 49 of the casing 50 of the switch and connected to earth. Said rod and the fixed contact 51 form together an earthing switch which connect the circuit-breaker with earth, when the isolator switch is in its open condition.

Mounted on the screwed spindle 43 is a bevel gear wheel 52 which meshes with the gear wheel 53 shown in dotted lines. With the aid of this gear wheel 53 or of a bevel gear wheel in front of the plane of drawing the screwed spindle 43 can be driven from one or the other longitudinal side of the combined isolator switch-earthing switch. This is necessary, when the longitudinal axis of the switch is directed perpendicularly to the plane of the drawing as is the fact with the isolator switch 9f shown in FIG. 4.

In both isolator switches shown in FIGS. 5 and 6 it is possible to direct the driving shaft in the extension of or at right angles with the direction, in which switch is connected with the junction point for the connection of a cable or network-line. This facilitates the driving of the isolator switches of a switching section by means of a common driving mechanism, also when the circuit-breakers of a row are not arranged in each others extensions but side by side. Furthermore the movable switching rod of each one of these two different isolator switches is permanently electrically conductively connected with the circuit-breaker, so that the movement of the movable earthing contact can be easily derived from said switching rod or said earthing contact can be easily combined with the switching rod. This means a simplification of the driving mechanism of the earthing switch, which otherwise would have been driven separately.

What we claim is:

1. Metal clad switch gear for high voltages provided in each phase with single-pole switching sections which are connected in series in a closed ring and junction points for the connection of cables or other network-lines, each switching section extending in said ring between two such junction points and comprising at least two isolator switches with single interruption, a circuit-breaker connected between said isolator switches, two earthing switches cooperating with said isolator switches, connecting conductors interconnecting said isolator switches and said circuit-breaker, driving mechanisms and metal casings surrounding said switches, circuit-breaker and connecting conductors, each isolator switch and each earthing switch including at least one fixed contact and one movable switching contact cooperating therewith, one of the two cooperating contacts of each isolator switch being permanently electrically conductively connected with a junction point and the other one being permanently electrically conductively connected both with a connecting conductor leading to the circuit-breaker and with one of the two cooperating contacts of the earthing switch cooperating with the isolator switch in question, the other contact of said earthing switch being attached to the metal casing surrounding said earthing switch, and the driving mechanisms of the two isolator switches and the two earthing switches of each switching section being so coupled with one another that during each switching operation in a section the two isolator switches thereof are simultaneously brought from their open into their closed and from their closed into their open condition, respectively, and the two earthing switches of said section are simultaneously brought from their closed into their open and from their open into their closed condition, respectively.

2. Metal clad switch gear as claimed in claim 1, in which the movable switching contact of each isolator switch of a switching section is permanently electrically conductively connected with a connecting conductor leading to the circuit-breaker of said section.

3. Metal clad switch gear as claimed in claim 2, in which the movable switching contact of each isolator switch of a switching section is an axially movable switching rod, a stationary holder being provided for the movable support of said rod, and in which each earthing switch of said switching section comprises at least one fixed contact attached to the casing surrounding the isolator switch cooperating with the earthing switch in question and one movable contact mounted for swinging about an axis at right angles with the longitudinal axis of the switching rod of said isolator switch on the holder of said rod, the swingable contact of said earthing switch being driven and locked in its end positions by said switching rod.

4. Metal clad switch gear as claimed in claim 2, in which the movable switching contact of each isolator switch of a switching section is an axially movable switching rod, said switching rod engaging, in its one end position, with its one end the fixed contact of the isolator switch in question and, in its other end position, with its other end a fixed contact attached to the casing of said isolator switch and meant for connection to earth, so that the movable switching rod of the isolator switch is also the movable switching contact of the earthing switch cooperating with said isolator switch.

* * * * *